(12) United States Patent
Hagiwara

(10) Patent No.: US 6,211,678 B1
(45) Date of Patent: Apr. 3, 2001

(54) METHOD FOR RADIAL PROFILING OF RESISTIVITY AT MULTIPLE DEPTHS OF INVESTIGATION

(75) Inventor: Teruhiko Hagiwara, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/337,601

(22) Filed: Jun. 21, 1999

(51) Int. Cl.[7] ................................ G01V 3/30; G01V 3/38
(52) U.S. Cl. ................................................ 324/338; 702/7
(58) Field of Search .................................. 324/338–341; 702/7; 175/50

(56) References Cited

U.S. PATENT DOCUMENTS

| 4,899,112 | * | 2/1990 | Clark et al. | 324/338 |
| 5,389,881 | * | 2/1995 | Bittar et al. | 324/338 |
| 5,448,171 | * | 9/1995 | Chemali et al. | 324/339 |
| 5,469,062 | * | 11/1995 | Meyer, Jr. | 324/338 |
| 5,594,343 | * | 1/1997 | Clark et al. | 324/338 |

* cited by examiner

Primary Examiner—Gerard Strecker
(74) Attorney, Agent, or Firm—Conley, Rose & Tayon

(57) ABSTRACT

A resistivity tool suitable for use in a borehole and configured to obtain a resistivity radial profile at multiple depths of investigation in a geological formation comprises a receiver pair and an array of transmitters. The distance of each transmitter from the receivers corresponds to a particular depth of investigation into the formation. Using as few as two transmitters, the resistivity tool derives resistivity values at any number of depths of investigation, including depths of investigation that do not correspond to transmitter/receiver spacings on the tool. A measurement processor combines signals received from the existing transmitters using linear interpolation, geometric interpolation, and/or other techniques to derive the resistivity measurements.

48 Claims, 5 Drawing Sheets

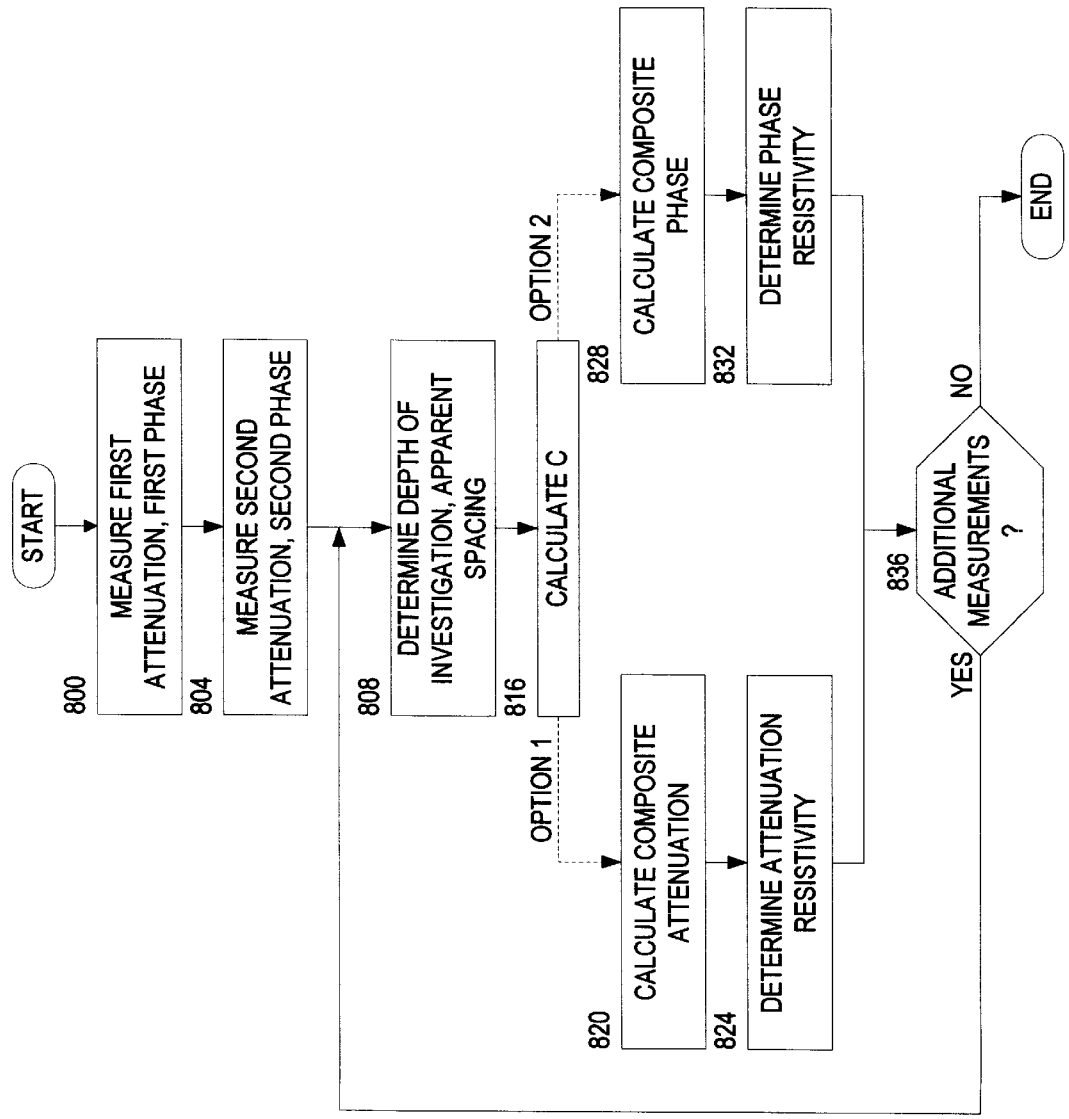

METHOD FOR RADIAL PROFILING OF RESISTIVITY AT MULTIPLE DEPTHS OF INVESTIGATION

FIELD OF THE INVENTION

The present invention relates generally to logging while drilling and particularly to resistivity tools. More particularly, the present invention relates to resistivity tools which profile resistivity at multiple depths of investigation.

BACKGROUND OF THE INVENTION

Wells, also known as wellbores or boreholes, are drilled to reach reservoirs of underground petroleum and other hydrocarbons. Often, wells are drilled in a vertical direction. The geological formations or strata that make up the earth's crust, however, generally lie in horizontal layers, so vertical wells are substantially perpendicular to the strata. If a certain formation contains hydrocarbons, it is often desirable to steer the drill in the horizontal direction to keep the well bore within that formation (called the "pay zone"), thus maximizing the recovery. Because the formations are underground and thus hidden from view, the well operator usually does not know exactly where to drill. Steering also can be difficult since formations may dip or divert.

To aid the well operator in locating and identifying subterranean formations, a probe (or "sonde") may be lowered into the wellbore to collect information about the structure of the formations, a procedure commonly known as "logging." The sonde typically includes one or more sensors to measure parameters downhole, is constructed as a hermetically sealed cylinder for housing the sensors, and hangs at the end of a long cable or "wireline." The cable or wireline provides mechanical support to the sonde and also provides an electrical connection between the sonde and electrical equipment located at the surface of the well. Normally, a cable within the sonde supplies operating power to the sonde and transmits information signals from the sonde to the surface. In accordance with conventional techniques, various parameters of the earth's formations are measured and correlated with the position of the sonde in the borehole as the sonde is pulled uphole.

The information collected by the sonde provides insight into the composition of the formations, including whether or not the formations are likely to contain hydrocarbons. Geological formations must be sufficiently porous to contain hydrocarbons, for example, so porosity of the strata is often measured to determine the capability of the formation to store hydrocarbons. Saturation of the formations is often measured, as well, to determine the amount of water, hydrocarbon, or fluid stored in the porous formations. Fundamental properties such as porosity and saturation can be used to estimate important characteristics of the formation, such as the size and quality of a reservoir and the ability of the reservoir to flow through the formation into the borehole.

While wireline logging is useful in characterizing formations downhole, it nonetheless has certain disadvantages. For example, before the wireline logging tool can be run in the wellbore, the drillstring and bottomhole assembly must first be removed or tripped from the borehole, resulting in considerable cost and loss of drilling time for the driller (who typically pays daily fees to rent the drilling equipment). In addition, because wireline tools are unable to collect data during the actual drilling operation, drillers must at times make decisions (such as the direction to drill) possibly without sufficient information, or else incur the cost of tripping the drillstring to run a logging tool to gather more information relating to conditions downhole. Furthermore, wireline logging occurs a relatively long time after the wellbore is drilled, calling into question the accuracy of the wireline measurements. As one skilled in the art will understand, the wellbore conditions tend to degrade as drilling fluids invade the formation around the wellbore. In addition, the borehole shape may begin to degrade, reducing the accuracy of the measurements.

To address the limitations associated with wireline logging, special tools were developed to collect data during the drilling process. By collecting and processing data during the drilling process, without the necessity of tripping the drilling assembly to insert a wireline logging tool, the driller can make accurate modifications or corrections "real-time" to optimize drilling performance. With a steerable system, the driller may change the direction of the drill bit. By detecting the adjacent bed boundaries, adjustments can be made to keep the drill bit in an oil rich pay zone. Moreover, measuring formation parameters during drilling, and hopefully before invasion of the formation, increases the usefulness of the measured data. Making formation and borehole measurements during drilling also can save valuable rig time which otherwise would be required to run a wireline logging tool.

Designs for measuring conditions downhole and the movement and location of the drilling assembly during drilling are known as "measurement-while-drilling" techniques, or "MWD." Similar techniques, concentrating more on the measurement of formation parameters of the type associated with wireline tools, are commonly known as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the position of the drilling assembly while the bottomhole assembly is in the well.

Because hydrocarbon-bearing formations tend to have unique and identifiable electrical properties, one type of logging, generally known as electric logging, measures these electrical properties. One of these electrical properties, known as conductivity, is a measure of how readily the formation conducts electric current. Conductivity, and its reciprocal property, resistivity, provide insight into formation characteristics such as fluid saturation, net reservoir thickness, porosity, and structural or stratigraphic dip. Measuring resistivity or conductivity is generally known as resistivity logging and is achieved by measuring electrical potentials, and sometimes currents, and/or electromagnetic waves in the borehole. These measured potentials, currents, and electromagnetic waves are influenced by the resistivities of all the materials surrounding the borehole.

Resistivity logging generally involves sending an electromagnetic wave from a transmitter on the LWD tool and capturing the wave at a receiver which is at another location on the LWD tool. For this reason, this type of resistivity logging is also known as electromagnetic wave logging. Typically, the transmitter sends the waves at a frequency between one and two million cycles per second (or 1–2 megahertz). Some tools, however, utilize frequencies in the range of thousands of cycles per second, or kilohertz. The formation resistivity causes changes in the intensity and timing of the transmitted wave, so the receiver does not receive an exact copy of the wave that the transmitter sent. Instead, the resistivity of the formation reduces (or "attenuates") the intensity of the signal and causes a time delay (or "phase shift") in the signal. Accordingly, the attenuation and phase shift can be measured at the receiver and used to gauge the resistivity of the formation, providing insight into the formation characteristics as described above. Resistivity derived from attenuation measurements is commonly called "attenuation resistivity," and resistivity derived from phase measurements is commonly known as "phase resistivity."

In a type of formation called "shaley-sand," for example, the shale bed can have a resistivity of about 1 ohm-meter. A bed of oil-saturated sandstone, on the other hand, is likely to have a higher resistivity of about 10 ohm-meters or more. The sudden change in resistivity at the boundary between beds of shale and sandstone can be used to locate these boundaries. In horizontal drilling, the drill bit can be steered to avoid this boundary and keep the wellbore inside the oil-producing bed.

A typical formation does not have a uniform (or "homogeneous") resistivity throughout, so it is usually desirable to measure the resistivity at various locations around the borehole to fully characterize the formation. Tools commonly measure the resistivity along a concentric ring around the borehole, at a radius which is called the "depth of investigation" or "radius of investigation." To thoroughly characterize the formation, measurements are taken at a variety of depths of investigation and at a variety of vertical positions within the borehole. The depth of investigation generally is determined by the distance between the transmitter and receiver, with a longer spacing resulting in a deeper depth of investigation and a shorter spacing providing a shallower depth of investigation. Accordingly, to measure the resistivity at multiple depths of investigation and thus achieve an accurate picture of the formation composition, a resistivity tool requires one transmitter/receiver pair for each desired depth of investigation. For instance, a resistivity tool that provides three depths of investigation requires three transmitter/receiver spacings. Such a resistivity tool might include, for example, one receiver and three transmitters or one transmitter and three receivers.

Because transmitter and receiver circuitry may respond differently to changing temperatures as a resistivity tool progresses downhole, early resistivity tools had to be calibrated across a range of temperatures. To maintain accuracy at certain intervals the calibration was repeated for each tool, requiring extra time, effort, and expense. More recently, compensated resistivity tools have been developed to overcome these biases. Compensated tools typically involve using extra transmitters and/or receivers which interact to cancel out the effects of the circuitry biases.

To measure the resistivity at a first depth of investigation, a first transmitter transmits a signal to one or more receivers. The geological formation attenuates and phase shifts the transmitted signal as it propagates to the receivers, so the received signals are slightly different than the transmitted signal in both magnitude and phase. A first compensating transmitter may transmit a compensating signal to the same set of receivers. The first compensating transmitter is spaced at the same distance from the receivers as the first transmitter but is located on the opposite side of the receivers. The signals received from both transmitters are combined using known techniques to produce a composite attenuation value and a composite phase value. For a given depth of investigation that is uniquely associated with the transmitter/receiver spacing, a resistivity value can be calculated as known function of either the composite attenuation value or the composite phase value.

To measure the resistivity at a second depth of investigation, a second transmitter must be located at a distance from the receivers that is different than the distance between the first transmitter and receivers (i.e., the distance must be less than or greater than the distance between the first transmitter and receivers). If the tool is compensated, then an additional compensating transmitter is required at the same distance from the receivers but on the opposite side from the main second transmitter. The receivers use signals received from the second transmitter and its associated compensating receiver to gauge the resistivity at a second depth of investigation, using either the composite attenuation value or composite phase value (or both) derived by combining the received signals.

To measure the resistivity at additional depths of investigation, the tool requires additional transmitters spaced at different distances from the receivers. Placing numerous transmitters on a resistivity tool, however, leads to some significant drawbacks. In particular, modern resistivity tools are fairly slow. The resistivity transmitters are fired sequentially, meaning that a greater number of transmitters results in a greater number of transmitter firings in any "set" of transmitter-receiver resistivity readings. Because firings occur sequentially, a large number of transmitters require a substantial amount of time to complete a set of resistivity readings. In addition, transmitters often are fired while the resistivity tool moves up or down the wellbore, and a large number of transmitters slow down the maximum practical speed at which a resistivity tool can progress through the borehole.

A less than ideal rate of movement up or down the borehole is not an insignificant problem. For example, in wireline logging, the sonde moves along the borehole wall as quickly as possible to minimize the time required to recover hydrocarbons and to minimize costs. As another example, in the LWD environment, a borehole may already be partially drilled and the drill bit assembly lowered a significant distance into the earth prior to actual drilling. An operator would like to quickly obtain a set of resistivity measurements while the frill string is being lowered downhole in the old wellbore. Further, in certain formations it is the data acquisition rate of the LWD tools, and not the ability of the drill bit to cut through formation, that limits drilling speed. Data acquisition while the drill bit assembly is being "tripped" or pulled up from the borehole is often also desirable. Because multiple transmitter resistivity tools use a long period of time to obtain a "set" of measurements, the disadvantages of a large number of transmitters undermine the advantage of a large number of transmitters.

Although substantial improvements have been made to resistivity tool design, numerous problems still exist. As explained, modern resistivity tools are slow and limit the maximum rate at which the tool may proceed past a wellbore wall. In addition, modern resistivity tools have high power requirements because of an increased number of transmitters and because transmitters far away from the receiver pair often transmit a stronger signal than transmitters close to the receiver pair. Lack of a sufficient number of transmitter/receiver spacings, however, limits the number of depths of investigation, thus preventing a thorough characterization of the formation.

For the foregoing reasons, a resistivity tool that does not require a different transmitter/receiver spacing for each depth of investigation would greatly improve the efficiency of logging while drilling operations. Despite the apparent advantages that such a system would provide, to date, no such device exists.

SUMMARY OF THE INVENTION

Accordingly, the present invention discloses a resistivity tool using as few as two transmitter/receiver spacings, which also is capable of determining the formation resistivity at any number of arbitrary depths of investigation. Under a preferred embodiment, the resistivity tool comprises a compensated tool with a pair of receivers $R_1$ and $R_2$, a first compensating pair of transmitters $T_1$ and $T_1'$ spaced at a distance $l_1$ from the center point between receivers $R_1$ and $R_2$, a second compensating pair of transmitters $T_2$ and $T_2'$ spaced at a distance $l_2$ from the center point between receivers $R_1$ and $R_2$, and a third compensating pair of transmitters $T_3$ and $T_3'$ spaced at a distance $l_3$ from the center point between receivers $R_1$ and $R_2$. Each of the transmitters delivers an electromagnetic waveform to the receivers, which detect the attenuation and phase of the received waveforms.

Using known techniques, a processor associated with one or both of the receivers (or above ground, in a separate computer system) is programmed to determine the resistivity based on the signals detected by the receivers. The signals received from the transmitter pair $T_1/T_1'$ are used to derive a first resistivity corresponding to the depth of investigation associated with the transmitter spacing $l_1$. Similarly, the signals received from the transmitter pair $T_2/T_2'$ are used to calculate a second resistivity corresponding to the depth of investigation associated with the transmitter spacing $l_2$, and the signals received from the transmitter pair $T_3/T_3'$ are used to determine a third resistivity corresponding to the depth of investigation associated with the transmitter spacing $l_3$.

Based on the signals received from two of the compensating transmitter pairs, either the signals received from transmitters $T_1/T_1'$ and $T_2/T_2'$, the signals received from $T_1/T_1'$ and $T_3/T_3'$, or the signals received from $T_2/T_2'$ and $T_3/T_3'$, the processor calculates the resistivity at an additional depth of investigation. The additional depth of investigation may correspond to any desired transmitter spacing, even if the resistivity tool does not provide a transmitter at the desired spacing.

Under a preferred embodiment, the resistivity is determined by linearly interpolating the complex envelopes, attenuation values, and/or phases of the signals received from the chosen compensating transmitter pairs. Alternatively, the resistivity is derived by geometrically interpolating or otherwise combining the complex envelopes, attenuation values, and/or phases of the signals. The resulting resistivity calculation corresponds to a transmitter spacing that is equal to the distance that results from interpolating the spacings of the chosen compensating transmitter pairs, although it is not necessary to place a transmitter at the interpolated spacing.

Thus, the present invention comprises a combination of features and advantages that enable it to substantially advance the art by providing a resistivity tool capable of measuring arbitrary and multiple depths of investigation. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of preferred embodiments is considered in conjunction with the following drawings, in which:

FIG. 8 illustrates a flowchart of a procedure for deriving resistivity at multiple arbitrary depths of investigation using the tool of FIG. 1.

DETAILED DESCRIPTION OF THE PREFERRED EMBODIMENTS

Figure 1:
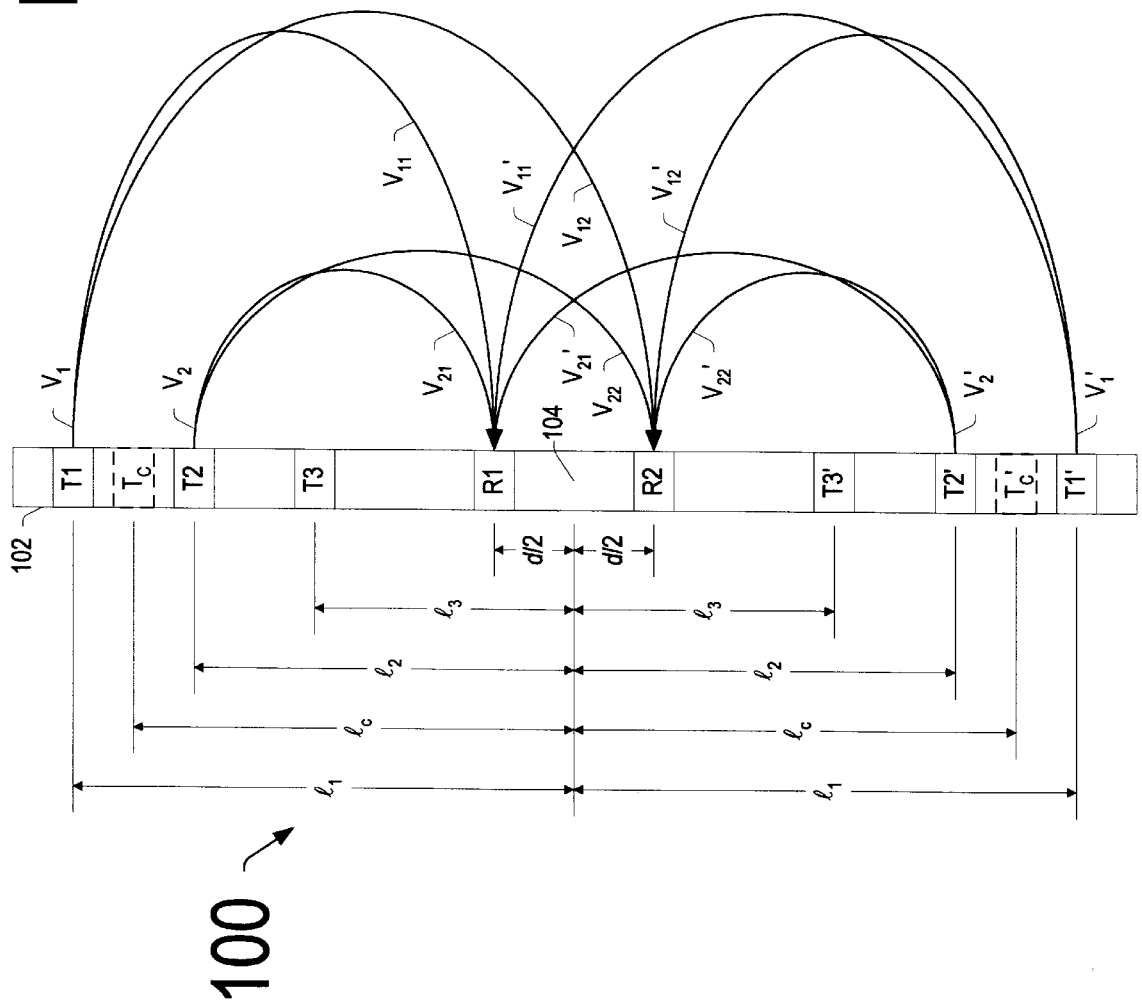
FIG. 1 illustrates a resistivity tool constructed in accordance with a preferred embodiment.

Referring initially to FIG. 1, a compensated resistivity tool 100 mounted on a drillstring 102 comprises a plurality of transmitters $T_1$, $T_2$, $T_3$, $T_1'$, $T_2'$, and $T_3'$ and a pair of receivers $R_1$ and $R_2$. As shown in the preferred embodiment of FIG. 1, the drillstring 102 is oriented vertically, and transmitter $T_1$ is situated at the top of the drillstring 102, progressing downward to transmitter $T_2$, transmitter $T_3$, receiver $T_1$, receiver $R_2$, transmitter $T_3'$, transmitter $T_2'$, and transmitter $T_1'$, in that order. As explained in greater detail below, transmitters $T_1'$, $T_2'$, and $T_3'$ are positioned to cancel the effects of unknown biases inherent in transmitters $T_1$, $T_2$, and $T_3$ and in receivers $R_1$ and $R_2$.

As one of ordinary skill in the art would recognize, a variety of transmitter/receiver arrangements may be implemented. An uncompensated tool might omit one or all of the compensating transmitters $T_1'$, $T_2'$, and $T_3'$ and/or one of the primary receivers $T_1$, $T_2$, and $T_3$. An uncompensated tool also might include a plurality of transmitter/receiver pairs, or any desired combination of transmitters and receivers, as long as at least two primary transmitters and one receiver are present. Although the tool 100 shown in FIG. 1 includes two receivers $R_1$ and $R_2$, an alternative embodiment may have only one receiver. The use of two receivers, however, permits measuring the difference between the phases of signals received at different points on the drillstring 102, a measurement technique commonly associated with higher transmission frequencies.

Figure 2:
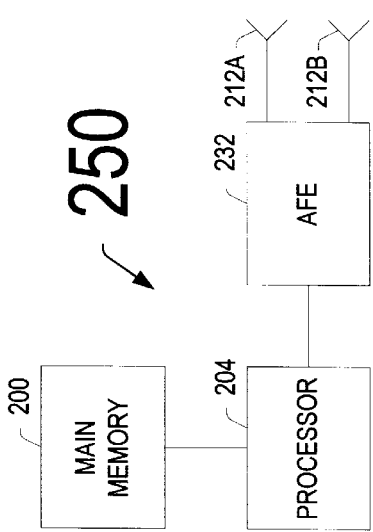
FIG. 2 depicts the block diagram of a receiver mounted on the tool of FIG. 1.

The transmitters and receivers generally include antennas for transmitting and receiving electromagnetic signals and typically couple to signal processing circuitry (not specifically shown) within the tool 100 which is used to generate and process the signals. The circuitry preferably includes a programmable microprocessor and/or a dedicated processing circuit and resides on one or more circuit cards internal to the drillstring 102. The signal processing circuitry also may include, for example, oscillators to generate timing signals and/or to generate the transmitted waveforms. The transmitters preferably emit a sine wave at a particular frequency, although any waveform may be used (e.g., a cosine wave), and the frequency can usually be adjusted. A preferred embodiment of the signal processing circuitry is discussed in greater detail below, as illustrated in FIG. 2.

Still referring to FIG. 1, receivers $R_1$ and $R_2$ are spaced on the drillstring 102 by a distance d, so that the center point 104 between the receivers $R_1$ and $R_2$ is a distance ½ d from each receiver. Transmitters $T_1$ and $T_1'$ are located on opposite sides of the receivers, at the same distance $l_1$ from the center point 104. Thus, as shown in FIG. 1, transmitter $T_1$ is situated at a distance $L_1$–½ d from receiver $R_1$ and at a spacing of $l_1$+½ d from receiver $R_2$. Transmitter $T_1'$ is located at a distance $l_1$+½ d from receiver $R_2$ and a distance $l_1$–½ d from receiver $R_1$. Similarly, transmitters $T_2$ and $T_2'$ are located on opposite sides of the receivers, at a distance $l_2$ from the center point 104. Accordingly, transmitter $T_2$ is located at a spacing of $l_2$–½ d from receiver $R_1$ and at a spacing of $l_2$+½ d from receiver $R_2$, and transmitter $T_2'$ is located at a spacing of $l_2$+½ d from receiver $R_1$ and a spacing of $l_2$–½ d from receiver $R_2$.

To measure the resistivity at a first depth of investigation, $D_1$, transmitter $T_1$ transmits a signal $V_1$ to both receivers $R_1$ and $R_2$. The geological formation attenuates and phase shifts the signal $V_1$ as it propagates to the receivers, so the signals $V_{11}$ and $V_{12}$, detected by receivers $R_1$ and $R_2$, respectively, are slightly different than the signal that was transmitted originally. The received signals $V_{11}$ and $V_{12}$ can be expressed in terms of attenuation $\eta_{11}$ and phase $\Phi_{11}$, and attenuation $\eta_{12}$ and phase $\Phi_{12}$, respectively. In a compensated tool, transmitter $T_1'$ transmits a signal $V_1'$, which is detected at receiver $R_1$ as signal $V_{11}'$, having attenuation $\eta_{11}'$ and phase $\Phi_{11}'$, and is detected at receiver $R_2$ as signal $V_{12}'$, having attenuation $\eta_{12}'$ and phase $\Phi_{12}'$. The received signals then are combined to produce a composite received value $$\eta_1 e^{i\varphi_1},$$

having composite attenuation $\eta_1$ and composite phase $\Phi_1$, as in equation (1):

$$\eta_1 e^{i\varphi_1} = \sqrt{\frac{V_{12} V_{11}'}{V_{11} V_{12}'}} \tag{1}$$

where the variable i represents the square root of –1. The composite value $$\eta_1 e^{i\varphi_1}$$

is known in the art as the "complex envelope" of the composite received signal, since the value identifies both the composite attenuation and the composite phase. For the depth of investigation $D_1$ that is associated with the transmitter/receiver spacing $l_1$, a first resistivity value can be calculated from the composite received value using known techniques.

To measure the resistivity at a second depth of investigation $D_2$, transmitter $T_2$ sends a signal $V_2$ that is received at receivers $R_1$ and $R_2$ as signals $V_{21}$ and $V_{22}$, respectively. Due to the effects of the formation, the received signals $V_{21}$ and $V_{22}$ are detected with attenuation levels $\eta_{21}$ and $\eta_{22}$, respectively, and with phases $\Phi_{21}$ and $\Phi_{22}$, respectively. For compensation, transmitter $T_2'$ transmits a signal $V_2'$ to the receivers. Accordingly, receiver $R_1$ detects the transmitted signal $V_2'$ as signal $V_{21}'$, having attenuation $\eta_{21}'$ and phase $\Phi_{21}'$, and receiver $R_2$ detects the transmitted signal $V_2'$ as signal $V_{22}'$, with attenuation $\eta_{22}'$ and phase $\Phi_{22}'$. The signals detected at receivers $R_1$ and $R_2$ from transmitters $T_2$ and $T_2'$ then may be combined to produce a composite value $$\eta_2 e^{i\varphi_2},$$

having composite attenuation $\eta_2$ and composite phase $\Phi_2$, as in equation (2):

$$\eta_2 e^{i\varphi_2} = \sqrt{\frac{V_{22} V_{21}'}{V_{21} V_{22}'}} \tag{2}$$

where the variable i represents the square root of –1. For the depth of investigation $D_2$ that is associated with the transmitter/receiver spacing $l_2$, a second resistivity value can be calculated using known techniques.

Under a preferred embodiment, the resistivity tool 100 includes a third pair of transmitters $T_3$ and $T_3'$, each spaced at a distance $l_3$ from the center point 104 between the receivers. Although the signals traveling from transmitters $T_3/T_3'$ to receivers $R_1$ and $R_2$ are not explicitly depicted in FIG. 1, the transmitters $T_3/T_3'$ nonetheless are capable of transmitting signals to the receivers $R_1$ and $R_2$ to permit measuring resistivity at a third depth of investigation $D_3$. Note that one of the transmitter pairs (i.e., $T_1/T_1'$, $T_2/T_2'$, or $T_3/T_3'$) may be omitted if desired. Further, it should be noted that the transmitter/receiver spacings $l_1$, $l_2$, and $l_3$ may be any desired values, although preferred embodiment envisions that $l_1$ equals 35 inches, $l_2$ equals 25 inches, and $l_3$ equals 15 inches.

FIG. 2 illustrates a block diagram of a preferred embodiment of signal processing circuitry 250 within the tool 102. The circuitry shown is directed toward the circuitry used for processing signals detected by the receivers $R_1$ and $R_2$, although the same circuitry may be used for transmitting signals. The signal processing circuitry 250 comprises a processor 204, a main memory 200 coupled to the processor 204, an analog front end (AFE) 232 coupled to the processor 204, and antenna terminals 212A and 212B coupled to the AFE 232. The antenna terminals 212A–B couple to antennas (not specifically shown) associated with receivers $R_1$ and $R_2$, which receive incoming signals from transmitters $T_1$, $T_1'$, $T_2$, $T_2'$, $T_3$, and $T_3'$. Each antenna generally comprises a wire or coil concentric to the drillstring 102, although any type of antennas are acceptable. In a preferred embodiment, the AFE 232 converts the incoming waveform from each antenna to a sequence of digital samples that is fed to the processor 204. Thus, the AFE 232 bandpass filters the incoming signals and digitally samples the filtered waveforms.

Based on the incoming samples from a particular antenna, the processor 204 calculates the attenuation and phase values of the received signals (i.e., the complex envelopes) and stores the attenuation and phase values in the memory 200. In an alternative embodiment, the AFE 232 detects the attenuation and phase of the incoming signals and provides these values to the processor 204 or directly to the memory 200. In another embodiment, the AFE 232 supplies the incoming samples directly to the memory 200, and the attenuation and phase are processed later, perhaps uphole. If desired, the processor 204 may include one or more input/output ports for communicating with the transmitters and receivers. Further, a common timing source preferably couples the receivers and transmitters, thus providing a common reference for determining the phase of the incoming signal at each receiver. Although the architecture shown in FIG. 2 is directed toward circuitry that resides in a physically different location than the transmitters and receivers, the signal processing circuitry 250 may be integrated with any one of the transmitters or receivers or distributed among the transmitters and receivers if desired. Note that the receiver may comprise any desired architecture without departing from the principles of this disclosure. Note also that the receivers $R_1$ and $R_2$ may be implemented as a single receiver circuit coupled to both antennas.

As explained above, use the transmitter pairs $T_1/T_1'$, $T_2/T_2'$, and $T_3/T_3'$ the compensated resistivity tool 100 is capable of gauging the resistivity of a formation at least three depths of investigation: a first depth $D_1$ associated with the $T_1/T_1'$ transmitter spacing $l_1$, a second depth $D_2$ associated with the $T_2/T_2'$ transmitter spacing $l_2$, and a third depth $D_3$ associated with the $T_3/T_3'$ transmitter spacing $l_3$. A conventional tool would require additional transmitters to measure resistivity at additional depths of investigation. The resistivity tool 100 of FIG. 1, however, is capable of accurately deriving the resistivity at any number of additional depths of investigation, without the need for additional transmitters.

To explain the techniques for estimating the resistivity at multiple arbitrary depths of investigation, this disclosure will focus on processing signals received from transmitters $T_1/T_1'$ and $T_2/T_2'$. Note, however, that signals from the transmitter pair $T_3/T_3'$ may be substituted for either the $T_1/T_1'$ pair or the $T_2/T_2'$ pair. Under a preferred embodiment, a number c is chosen to represent an "apparent" transmitter/receiver spacing $l_c$. The number c defines a linear combination of two of the receiver spacings $l_1$, $l_2$, and $l_3$. Under a preferred embodiment, c comprises a number less than 1 and greater than zero. The value of c may be set to any desired value, however. Equation (3) defines the apparent spacing $l_c$ as a function of $l_1$ and $l_2$:

$$l_c = cl_1 + (1-c)l_2 \quad (3)$$

Note that if the third transmitter pair $T_3/T_3'$ is used, the third spacing $l_3$ may be substituted for either the first spacing $l_1$ or the second spacing $l_1$ in equation (3), so that the apparent spacing $l_c$ is formed as a linear combination of the third spacing $l_3$ and either $l_1$ or $l_2$. As one of ordinary skill in the art would immediately recognize, the availability of three transmitters permits up to three different linear combinations of two spacings: a linear combination of the $l_1$–$l_2$ spacings, a linear combination of the $l_1$–$l_3$ spacings, or a linear combination of the $l_2$–$l_3$ spacings. If additional transmitters are included on the tool 100, linear spacing combinations may be formed using the additional transmitter(s), as well.

For values of c between 0 and 1, the technique defined by equation (3) is commonly known as "interpolation." For values of c less than 0 or greater than 1, however, the relationship defined by equation (3) is commonly known as "extrapolation." For simplicity, the term "interpolation" is intended herein to encompass both interpolation and extrapolation, except where otherwise noted.

As one of ordinary skill in the art would recognize, varying the value of c changes the value of the apparent spacing $l_c$. Because each transmitter/receiver spacing is associated with a unique depth of investigation, a new depth of investigation $D_c$ may be specified by choosing the value of c such that the apparent spacing $l_c$ corresponds to the desired depth of investigation $D_c$.

Figure 3:
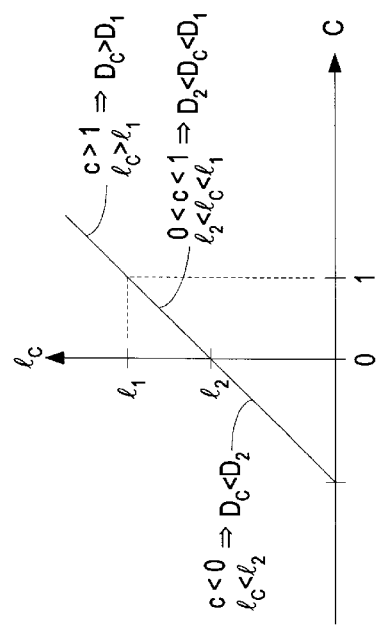
FIG. 3 shows a graph of interpolated transmitter/receiver spacings.

FIG. 3 illustrates the apparent transmitter/receiver spacing $l_c$ graphed as a function of c. For values of c greater than 1, $l_c$ is greater than $l_1$. Thus, the depth of investigation $D_c$ is greater than $D_1$ (the depth corresponding to $l_1$), for values of c greater than 1. For values of c less than 0, $l_c$ is less than $l_2$. The depth of investigation $D_c$, therefore, is less than $D_2$ (the depth corresponding to $l_2$), for values of c less than 0. for a value of c between 0 and 1, the apparent spacing $l_c$ is between the spacings $l_1$ and $l_2$. Accordingly, a value of c between 0 and 1 corresponds to a depth of investigation $D_c$ that is between the depths of investigation $D_1$ and $D_2$.

Referring again to FIG. 1, a pair of "apparent" transmitters $T_c/T_c'$ are shown attached to the tool 100, placed at a distance $l_c$ from the center point 104. The apparent transmitters $T_c/T_c'$ do not represent actual transmitters but instead depict the transmitters that normally would be required to measure the resistivity at a depth of investigation $D_c$ corresponding to the transmitter spacing $l_c$. As will be discussed in greater detail below, the resistivity tool 100 of this disclosure can accurately estimate the resistivity at any arbitrary depth $D_c$ without the need for additional transmitters. Thus, the apparent transmitters $T_c/T_c'$ represent resources which are saved by the present embodiment.

Upon choosing a value of c that specifies the apparent spacing $l_c$ associated with the desired depth of investigation $D_c$, a new resistivity value may be estimated at the depth $D_c$ without the need for additional transmitters. The new resistivity may be estimated using the attenuation of the signals detected by receivers $R_1$ and $R_2$, the phases of the signals detected by receivers $R_1$ and $R_2$, or both. As explained above, equation (3) comprises a linear combination, or interpolation, of the spacings $l_1$ and $l_2$, since varying the combination weighting (i.e., varying the value of c), defines a straight line in two dimensions. Similarly, in a preferred embodiment the processor 204 calculates an apparent phase value $\phi_c$ using a linear function of the composite phases $\phi_1$ and $\phi_2$, as specified by equation (4):

$$\phi_c = c\phi_1 + (1-c)\phi_2 \quad (4)$$

The processor 204 also calculates an apparent attenuation value $\eta_c$ using a linear function of the composite received attenuation values $\eta_1$ and $\eta_2$. Equation (5) specifies the preferred linear relationship:

$$ln(\eta_c) = cln(\eta_1) + (1-c)ln(\eta_2) \quad (5)$$

Note that the linear combination of equation (5) preferably operates on the natural logarithm of the attenuation values $\eta_1$ and $\eta_2$, rather than the raw attenuation values. For purposes of this disclosure, a linear combination should be interpreted as either a combination of the raw values (as in equation 4) or a combination of the logarithms of the values (as in equation 5), and either type of combination is suitable for implementing the embodiments. Further, the term "linear combination" refers to a broad range of mathematical combinations, including but not limited to interpolation and convex combinations.

The apparent attenuation $\eta_c$, the apparent phase $\phi_c$, or both may be used to estimate the resistivity value at the desired depth of investigation $D_c$ using known techniques to map the apparent phase $\phi_c$ to a phase resistivity value and/or map the apparent attenuation $\eta_c$ to an attenuation resistivity value. The apparent attenuation value $\eta_c$ and apparent phase value $\phi_c$ represent the composite attenuation and phase that would be detected from an additional transmitter pair on the tool 100 (e.g., the apparent transmitters $T_c/T_c'$).

Figure 4A:
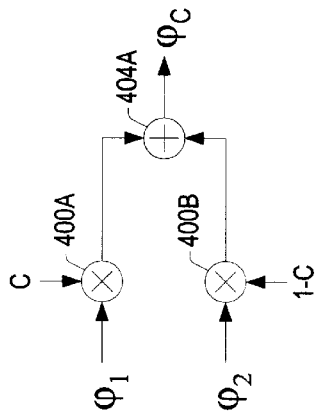
FIG. 4A is a flow diagram that illustrates the processing of composite received phase values to determine an apparent phase using linear interpolation.

FIG. 4A illustrates a flow diagram of the operations performed by the processor 204 to derive the apparent phase value $\phi_c$, based on the composite phase $\phi_1$ associated with transmitters $T_1/T_1'$, the composite phase $\phi_2$ associated with transmitters $T_2/T_2'$, and the chosen value of c. The flow diagram comprises two multipliers 400A and 400B coupled to an adder 404A. As one of ordinary skill in the art would immediately recognize, the multipliers 400 and adder 404 may comprise dedicated circuitry or programmable operations implemented by general purpose multiplication and addition hardware, or software routines. The value of 1−c may be stored in main memory 200 or calculated as needed and retained temporarily by the processor 204. Similarly, the input values of $\Phi_1$, $\Phi_2$, and c may be stored in temporary registers during processing and/or retrieved from main memory 200 as needed. Multiplier 400A receives the composite phase $\Phi_1$ and the value of c, inputting the product $c\Phi_1$ to the adder 404A. Multiplier 400B receives the values of $\Phi_2$ and 1−c and supplies the resulting product $(1-c)\Phi_2$ to the adder 404A. Adder 404A calculates the sum of the products $c\Phi_1$ and $(1-c)\Phi_2$ that represents the apparent phase $\Phi_c$. The apparent phase value $\Phi_c$ is then converted to a phase resistivity value according to known techniques, thus providing a new resistivity value associated with the depth of investigation $D_c$.

Figure 4B:
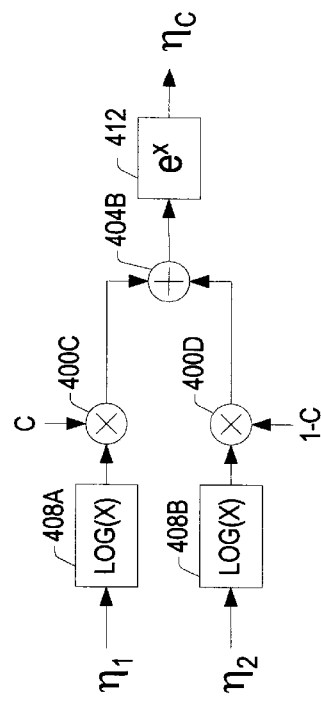
FIG. 4B is a flow diagram that illustrates the processing of composite received attenuation values to determine an apparent attenuation value using linear interpolation.

FIG. 4B illustrates a flow diagram of the operations performed by the processor 204 to derive the apparent attenuation value $\eta_c$, based on the attenuation $\eta_1$ associated with transmitters $T_1/T_1'$, the attenuation associated with transmitters $T_2/T_2'$, and the chosen value of c. The flow diagram comprises log units 408A and 408B, multipliers 400C and 400D, adder 404B, and exponential unit 412. The log units 408A–B preferably output the natural logarithms of the incoming values, or the logarithms associated with the base value e (which represents the base of the natural logarithm). If desired, however, the exponential unit 412 may operate according to any desired base value other than e (e.g., base 2). Similarly, the exponential unit 412 preferably calculates an output value that represents the base value e taken to the power of the exponent represented by the input value to the exponential unit 412. Although the exponential unit 412 may operate according to bases other than e (e.g., base 2), the log units 408A–B and exponential unit 412 preferably operate according to the same base value.

As shown in FIG. 4B, log unit 408A receives the first attenuation value $\eta_1$, providing the value $\ln(\eta_1)$ to the multiplier 400C. Multiplier 400C also receives the value of c and transmits the associated product $$c\ln(\eta_1 e^{i\varphi_1})$$

to the adder 404B. The second attenuation value $\eta_2$, which supplies the input value to log unit 408B, undergoes similar processing. Log unit 408B provides the converted attenuation value $\ln(\eta_2)$ to multiplier 400D, which provides the product of $$(1-c)\ln(\eta_2 e^{i\varphi_2})$$

to the adder 404B. Adder 404B calculates the sum $$c\ln(\eta_1 e^{i\varphi_1}) + (1-c)\ln(\eta_2 e^{i\varphi_2}),$$

which is processed through the exponential unit 412 to become the apparent attenuation value $\eta c$. The value $\eta_c$ is then converted to an attenuation resistivity value according to known techniques, thus providing a new resistivity value associated with the depth of investigation $D_c$.

As one of ordinary skill in the art would recognize, the log units 408A–B and exponential unit 412 may be eliminated in the flow diagram of FIG. 4B if desired. According, the adder 404B may be replace with a multiplier, and the multipliers 400C–D may be replaced with exponential units which utilize the input values as the base values and either c or 1−c as the exponents.

Figure 5:
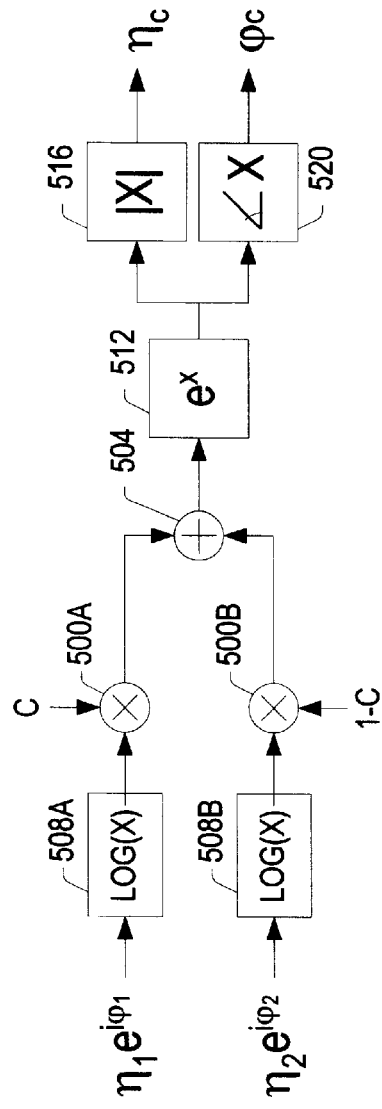
FIG. 5 is a flow diagram that illustrates the processing of a complex signal envelope to determine apparent attenuation and phase values using linear interpolation.

FIG. 5 illustrates an alternative embodiment, under which the processor 204 calculates the apparent attenuation value $\eta_c$ and phase value $\Phi_c$ define din equations (4) and (5), using the complex received signals $$\eta_1 e^{i\varphi_1} \text{ and } \eta_2 e^{i\varphi_2}$$

as input values. Although the flow diagrams of FIGS. 4A–B may be used interchangeably with the operations shown in FIG. 5, the present embodiment may be particularly useful if the composite attenuation values $\eta_1$, $\eta_2$ and/or composite phase values $\Phi_1$, $\Phi_2$ are not readily available. The flow diagram comprises a pair of log units 508A–B, a pair of multipliers 500A–B, an adder 504, an exponential unit 512, an attenuation detector 516, and a phase detector 520. The log units 508A–B receive the complex input values $$\eta_1 e^{i\varphi_1} \text{ and } \eta_2 e^{i\varphi_2},$$

respectively, outputting the natural logarithms of the input values to the multipliers 500A–B, respectively. If desired, the log units may operate according to base values other than e, although both log units 508 preferably utilize the same base value. Multiplier 500A also receives the value c, providing the product $$c\ln(\eta_1 e^{i\varphi_1})$$

to the adder 504. Similarly, multiplier 500B also receives the value 1−c, outputting the product $$(1-c)\ln(\eta_2 e^{i\varphi_2})$$

to the adder 504.

Adder 504 supplies the sum of the products of the multipliers 500A–B to the exponential unit 512, which raises the base of the natural logarithm, denoted by e, to the input sum. The output value of the exponential unit 512 represents the complex attenuation/phase value $$\eta_c e^{i\varphi_c}.$$

Note that the exponential unit 512 may operate according to a base value other than e, although the base value preferably corresponds to the same base value used for the log units 508A–B. Attenuation detector 516 then extracts the apparent attenuation $\eta_c$ by determining the magnitude of the complex attenuation/phase value, and the phase detector determines the apparent phase $\Phi_c$ by calculating the phase of complex attenuation/phase value.

Figure 6:
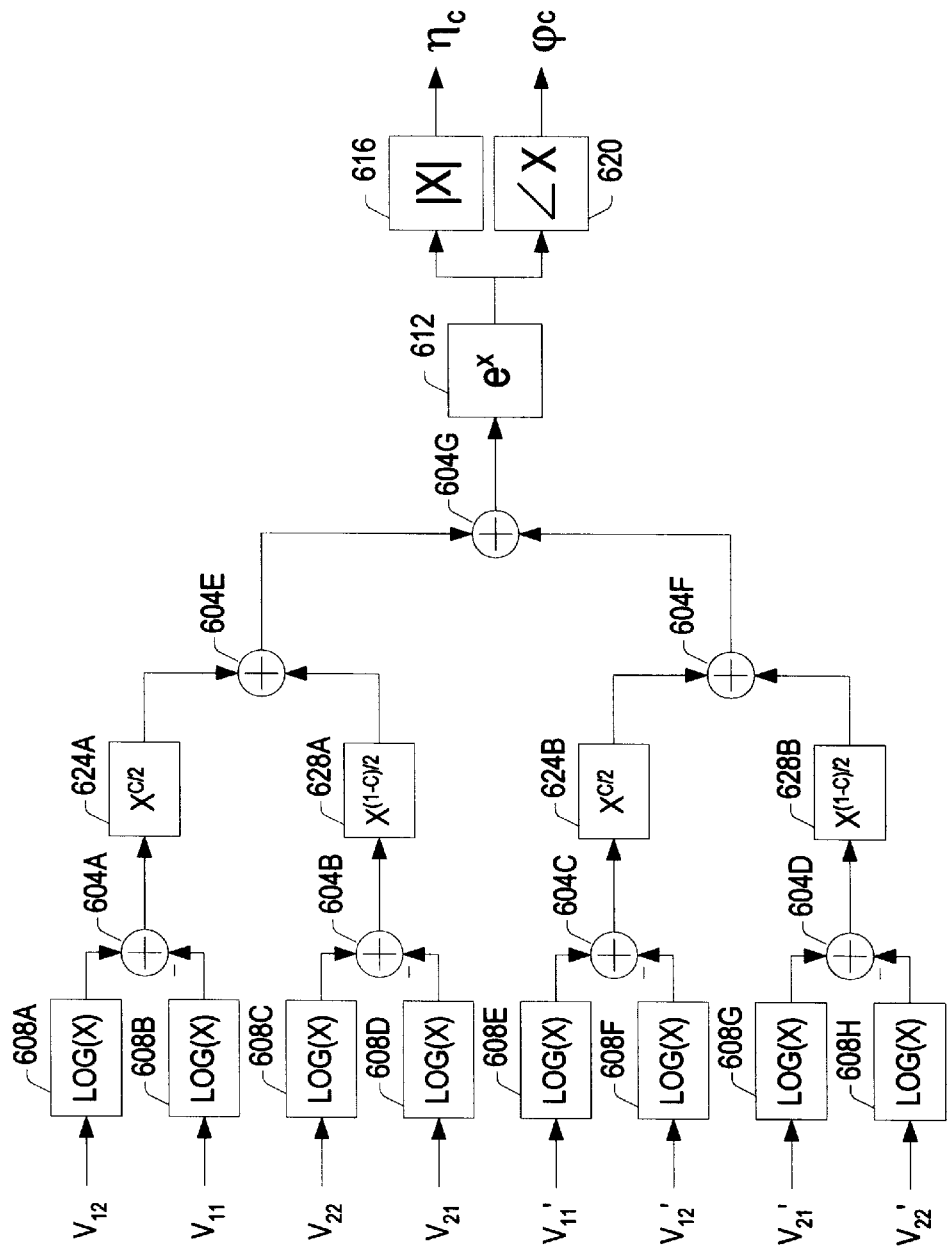
FIG. 6 is an alternative flow diagram that illustrates the processing of individual received signals to determine apparent attenuation and phase values using linear interpolation.

FIG. 6 illustrates an alternative embodiment, under which the processor 204 calculates the apparent attenuation value $\eta_c$ and phase value $\Phi_c$ defined in equations (4) and (5). The embodiment of FIG. 6, however, employs as input values the received signals $V_{11}$ and $V_{11}'$ (detected by receiver $R_1$ from transmitters $T_1$ and $T_1'$), $V_{12}$ and $V_{12}'$ (detected by receiver $R_2$ from transmitters $T_1$ and $T_1'$), $V_{21}$ and $V_{21}'$ (detected by receiver $R_1$ from transmitters $T_2$ and $T_2'$), and $V_{22}$ and $V_{22}'$ (detected by receiver $R_2$ from transmitters $T_2$ and $T_2'$). Although the flow diagrams of FIG. 5 and FIGS. 4A–B may be used interchangeably with the operations shown in FIG. 6, the present embodiment may be particularly useful if the complex received signals are not readily available.

As shown in FIG. 6, the flow diagram comprises an array of eight log units 608A–H (one unit for each incoming signal), a bank of four adders 604A–D pairwise combining the output values of the log units 608, for base units 624A–B and 628A–B which operate on the sums of the adders 604A–D, a set of three adders 604E–G which combine the base unit output values, an exponential unit 612 that calculates a complex attenuation/phase value $$\eta_c e^{i\varphi_c},$$

an attenuation detector 616 that determines the magnitude of the complex attenuation/phase value $$\eta_c e^{i\varphi_c},$$

and a phase detector 620 that extracts the phase of the complex attenuation/phase value $$\eta_c e^{i\varphi_c}.$$

As would be understood to one of ordinary skill in the art, each of the adders 604A–D includes one inverting input terminal so that the output value represents the difference (i.e., subtraction) of the two received values. Note that, as in previous embodiments, the operational blocks illustrated in FIG. 6 may represent dedicated circuitry or may be implemented using programmable processor resources, as desired.

Now referring in detail to FIG. 6, log units 608A–H preferably calculate the natural logarithms of their input values, although other logarithmic bases are envisioned. Specifically, log unit 608A provides the natural log of input value $V_{12}$, log unit 608B calculates the natural log of input value $V_{11}$, log unit 608C determines the natural log of input value $V_{22}$, log unit 608D provides the natural log of input value $V_{21}$, log unit 608E computes the natural log of input value $V_{11}'$, log unit 608F calculates the natural log of input value $V_{12}'$, log unit 608G provides the natural log of input value $V_{21}'$, and log unit 608H determines the natural log of input value $V_{22}'$.

Adder 604A sums the value of log units 608A with the inverted value of log unit 608B to produce the sum $\ln(V_{12})-\ln(V_{11})$. Similarly, adder 604B adds the output value of log unit 608C with the inverted output value of log unit 608D, adder 604C combines the output value of log unit 608E with the inverted output value of log unit 608F, and adder 604D sums the output value of log unit 608G with the inverted output value of log unit 608H. Accordingly, adder 604B provides the sum $\ln(V_{22})-\ln(V_{21})$, adder 604C produces $\ln(V_{11}')-\ln(V_{12}')$, and adder 604D calculates $\ln(V_{21}')-\ln(V_{22}')$.

The output values of base units 624A–B are calculated by taking their input values to the power of ½ c, and base units 628A–B calculate output values by taking their input values to the power of ½(1−c). Accordingly, the output value of base unit 624A is the output value of adder 604A taken to the power of ½ c, the output value of base unit 628A represents the sum of adder 604B taken to the power of ½(1−c), the output value of base unit 624B is the result of adder 604C taken to the power ½ c, and the output value of base unit 628B represents the output value of adder 604D taken to the power of ½(1−c).

Adders 604E–F calculate the sum of the output values from the base units 624 and 628. As shown in FIG. 6, adder 604E sums the output values of base units 624A and 628A, and adder 604F sums the output values of base units 624B and 628B. Adder 604G combines the sums from adders 604E–F, feeding the resulting sum to exponential unit 612. The exponential unit 612 raises e, the base of the natural log, to the power defined by the output value of adder 604G. Note that the exponential unit may operated according to a base value other than e, although the base value preferably is the same as the base value associated with the log units 608A–H. Accordingly, the log units 608 may operate according to any desired base, although all of the log units 608 preferably are associated with a common base value.

The output value of the exponential unit 612 represents the complex attenuation/phase value $$\eta_c e^{i\varphi_c}$$

that can be used to provide a new resistivity estimate at the desired depth of investigation $D_c$. Accordingly, attenuation detector 616 calculates the magnitude of the complex attenuation/phase value $$\eta_c e^{i\varphi_c},$$

which can be converted to an attenuation resistivity value using known techniques, and phase detector 620 calculates the phase of the complex attenuation/phase value $$\eta_c e^{i\varphi_c},$$

which can be used to determine a phase resistivity value using known techniques.

In an alternative embodiment, the apparent phase $\Phi_c$ and/or apparent attenuation $\eta_c$ may be calculated according to equations (6) and (7):

$$\Phi_c = \Phi_1{}^c \Phi_2{}^{(1-c)} \tag{6}$$

$$ln(\eta_c) = ln(\eta_1)^c ln(\eta_2)^{(1-c)} \tag{7}$$

In contrast with equations (4) and (5), which comprise linear combinations of the composite phase or attenuation values, the apparent attenuation and phase values given by equations (6) and (7) comprise "geometric" combinations. In contrast with linear combinations, in which the variables (e.g., $\Phi$ and $\eta$) are multiplied by constant values (e.g., c and 1−c) and then added, the variables under a geometric combination are taken to a constant power (e.g., $\Phi_1$ is taken to the power of c) and then multiplied. Note that the geometric interpretation of equation (7) preferably operates on the natural logarithms of the attenuation values $\eta_1$ and $\eta_2$, rather than the raw attenuation values. For purposes of this disclosure, a geometric combination should be interpreted as either a combination of the raw values (as in equation 6) or a combination of the logarithms of the values (as in equation 7), and either type of combination is suitable for implementing the embodiments. Further, the term geometric combination is intended to refer to a broad category of mathematical combinations, including but not limited to geometric interpolation.

Figure 7B:
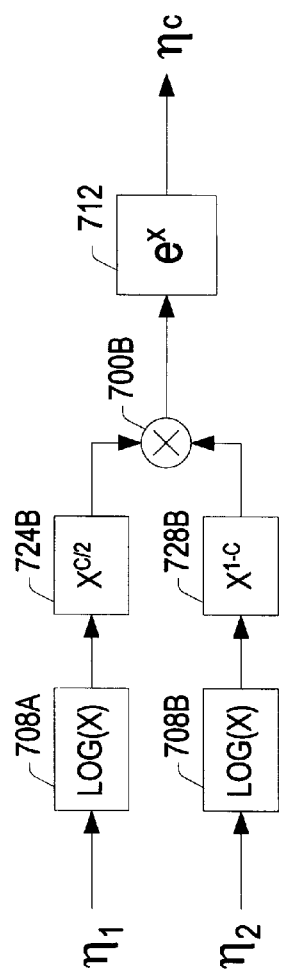
FIG. 7B is a flow diagram that illustrates the processing of composite received attenuation values to determine an apparent attenuation value using geometric interpolation.
Figure 7A:
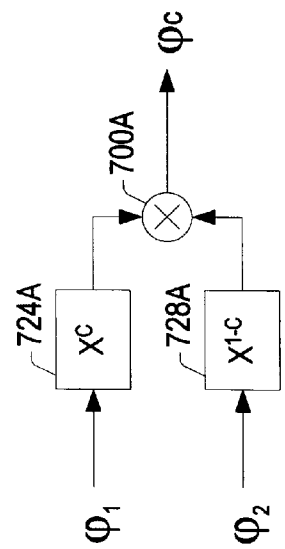
FIG. 7A is a flow diagram that illustrates the processing of composite received phase values to determine an apparent phase value using geometric interpolation.

FIG. 7A illustrates a flow diagram of the operations performed by the processor 204 to derive the apparent phase value $\Phi_c$, based on the composite phase $\Phi_1$ associated with transmitters $T_1/T_1'$, the composite phase $\Phi_2$ associated with transmitters $T_2/T_2'$, and the chosen value of c, according to equation (6). The flow diagram comprises base units 724A and 728A receiving the composite phase values $\Phi_1$ and $\Phi_2$, respectively, each base unit providing an operand to a multiplier 700A. Base unit 724A takes its input value ($\Phi_1$) to the power of c, while base unit 728A takes its input value ($\Phi_2$) to the power of 1–c. Accordingly, the multiplier calculates the apparent phase value $\Phi_c$ as $\Phi_1{}^c\Phi_2{}^{(1-c)}$. The apparent phase value $\Phi_c$ may then be used to generate a phase resistivity, using known techniques.

FIG. 7B illustrates a flow diagram of the operations performed by the processor 204 to derive the apparent attenuation value $\eta_c$, based on the composite attenuation $\eta_1$ associated with transmitters $T_1/T_1'$, the composite attenuation $\eta_2$ associated with transmitters $T_2/T_2'$, and the chosen value of c, according to equation (7). The flow diagram comprises natural log units 708A–B which receive the attenuation inputs $\eta_1$ and $\eta_2$, respectively, feeding the results to a pair of base units 724B and 728B. Each base unit supplies a multiplicand to a multiplier 700B, which drives an exponential unit 712. The log units 708A–B and exponential unit 712 preferably operate on the base of the natural logarithm, e, but may use any desired base value. The output value of the exponential unit 712 provides the apparent attenuation value $\eta_c$.

Examining the flow diagram of FIG. 7B in greater detail, log unit 708A receives the composite attenuation value $\eta_1$ and provides the result to base unit 724B, which takes its input value to the power of c. Similarly, log unit 708B receives the composite attenuation value $\eta_2$ and provides the result to base unit 728B, which takes its input value to the power of (1–c). Multiplier 700B then computes the product of the base unit output values, and the exponential unit 712 takes the base value e to the power defined by the multiplier product. The resulting apparent attenuation value $\eta_c$ may then be used to generate an attenuation resistivity value, using known techniques.

FIG. 8 illustrates a procedure for estimating any number of resistivities at arbitrary depths of investigation, without requiring additional transmitters on the resistivity tool 100. Beginning with blocks 800 and 804, the resistivity tool 100 determines the composite attenuation levels $\eta_1$ and $\eta_2$ and composite phases $\Phi_1$ and $\Phi_2$ of the signals received from transmitters $T_1/T_1'$ and $T_2/T_2'$. Next, in block 808, the desired depth of investigation $D_c$ is determined. As described previously, a given depth of investigation $D_c$ is associated with a unique transmitter/receiver spacing $l_c$. Accordingly, the associated transmitter spacing $l_c$ associated with the value of $D_c$ is also determined in block 808. If desired, the depth value $D_c$ need not be explicitly calculated; instead, the depth value $D_c$ may be implicitly calculated simply by determining an apparent transmitter spacing $l_c$ directly. Based on the apparent transmitter spacing, the value of c is calculated in block 816. Noting that c defines a linear relationship between the existing transmitter spacings $l_1$ and $l_2$, one of ordinary skill in the art would recognize that c represents the value that satisfies equation (3), based on the chosen value of $l_c$. Accordingly, c may be calculated as a function of $l_c$, $l_1$, and $l_2$, as given by equation (8), below:

$$c = \frac{l_c - l_2}{l_1 - l_2} \quad (8)$$

Next, either the attenuation resistivity or phase resistivity, or both, may be calculated. To calculate the attenuation resistivity (denoted by "option 1" on the flowchart), an apparent attenuation value $\eta_c$ is calculated in block 820, using any desired technique, such as one of the embodiments described above in FIGS. 4B, 5, 6, and 7B. From the apparent attenuation value $\eta_c$, and as denoted at block 824, the attenuation resistivity estimate for the chosen depth $D_c$ may be determined using known techniques. To determine additional resistivities (block 836), return to block 808.

To generate a phase resistivity estimate based on the desired depth of investigation $D_c$, follow "option 2" of the flowchart. Beginning with block 828, an apparent phase value $\Phi_c$ is calculated using any desired technique, such as one of the embodiments described above in FIGS. 4A, 5, 6, and 7A. Based on the apparent phase value $\phi_c$, and as denoted at block 832 the phase resistivity estimate for the chosen depth $D_c$ may be determined using known techniques. To determine additional resistivities (block 836), return to block 808. Note that both option 1, estimating attenuation resistivity, and option 2, estimating phase resistivity, may be taken if desired for a particular depth of investigation $D_c$.

Also note that the procedures illustrated in FIG. 8 may occur in any desired order. For example, the composite attenuation and phase measurements $\eta_1$, $\Phi_1$, $\eta_2$, and $\Phi_2$ may be collected in any order and at any time. Also, the values for $D_c$, $l_c$, and/or c may be determined before, during, or after taking the attenuation and phase measurements. If desired, the values for $D_c$, $l_c$, and/or c may be stored in main memory 200 prior to operation of the total 100, transmitted to the tool 100 during normal operation, or supplied after the tool 100 is brought uphole. It should be further noted that any or all of the procedures and calculations disclosed herein may occur during logging or afterward, and may be performed either at the tool 100 or on a separate computer system (including both dedicated and general purpose/programmable machines). As one example, the signals detected at the tool 100 may be stored in main memory 200 during drilling and loaded into a computer workstation, after drilling, to calculate resistivities. In addition, a wide range of techniques may be used to derive the apparent attenuation and/or phase values, including any type of linear combination, such as linear interpolation or convex combination, any type of geometric combination, such as geometric interpolation, and any other desired techniques such as the use of higher order polynomial combinations, spline curves, or any combination of techniques.

Accordingly, the resistivity tool and associated processing techniques disclosed herein permit determining the resistivity of earth formations at multiple arbitrary depths of investigation. Unlike conventional resistivity tools, however, the principles of this disclosure may be implemented without the need for multiple transmitter spacings for each depth of investigation. As a result, resistivity tool may be developed with a minimum number of transmitters and receivers, saving valuable logging time (and thus drilling time), processing time, and electric power. Further, additional resistivity measurements may be calculated at any desired depths of investigation even after the tool 100 has been removed from the borehole, using the attenuation and phase data collected from the two transmitter/receiver spacings.

Numerous variations and modifications will become apparent to those skilled in the art once the above disclosure is fully appreciated. It is intended that the following claims be interpreted to embrace all such variations and modifications.

I claim:

1. A method for profiling resistivity in a borehole at multiple depths of investigation, comprising:

receiving, by each receiver of a receiver pair, a first electromagnetic wave transmitted by a first transmitter, wherein the distance between said receiver pair and said first transmitter corresponds to a first depth of investigation;

receiving, by each receiver of the receiver pair, a second electromagnetic wave transmitted by a second transmitter, wherein the distance between said receiver pair and said second transmitter corresponds to a second depth of investigation;

combing outputs from the receiver pair associated with the first and second electromagnetic waves to calculate a resistivity value corresponding to a third depth of investigation, wherein the third depth of investigation is different than the first and second depths of investigation.

2. The method of claim 1, including:

measuring a first attenuation value belonging to the first wave;

measuring a second attenuation value belonging to the second wave; and calculating the resistivity value as a function of the first and second attenuation values.

3. The method of claim 2, including combining the first and second attenuation values to derive a composite attenuation value, wherein the resistivity value comprises the attenuation resistivity value associated with the composite attenuation value.

4. The method of claim 3, wherein the composite attenuation value comprises a linear combination that includes the first and second attenuation values.

5. The method of claim 3, wherein the composite attenuation value comprises a geometric combination that includes the first and second attenuation values.

6. The method of claim 3, wherein the third depth of investigation is between the first and second depths of investigation.

7. The method of claim 1, including:

measuring a first phase value belonging to the first wave;

measuring a second phase value belonging to the second wave; and calculating the resistivity value as a function of the first and second phase values.

8. The method of claim 7, wherein the first and second phase values comprise phase difference.

9. The method of claim 7, including combining the first and second phase values to derive a composite phase value, wherein the resistivity value comprises the phase resistivity value associated with the composite phase value.

10. The method of claim 9, wherein the composite phase value comprises a linear interpolation that includes the first and second phase values.

11. The method of claim 9, wherein the composite phase value comprises a geometric interpolation that includes the first and second phase values.

12. A method for profiling resistivity in a borehole, comprising:

locating a first transmitter at a first distance from a receiver pair;

locating a second transmitter at a second distance from the receiver pair;

choosing a third distance from said receiver pair that is different than the first and second distances;

measuring a first complex envelope of a signal transmitted form the first transmitter and received by the receiver pair;

measuring a second complex envelope of a signal transmitted from the second transmitter and received by the receiver pair; and deriving a resistivity based on the first and second complex envelopes, wherein the depth of investigation of the derived resistivity corresponds to a transmitter to receiver spacing equal to the third distance.

13. The method of claim 12, including linearly combining the first and second distances to determine the third distance.

14. The method of claim 12, including deriving the resistivity without placing a transmitter at the third distance.

15. The method of claim 14, including linearly combining the first and second complex envelopes to derive the resistivity.

16. The method of claim 15, wherein the linear combination is based on the position of the third distance relative to the first and second distances.

17. The method of claim 16, including deriving the resistivity based on the magnitude of the linear combination.

18. The method of claim 16, including deriving the resistivity based on the phase of the linear combination.

19. The method of claim 14, including deriving the resistivity based on a geometric combination of the first and second complex envelopes.

20. The method of claim 19, wherein the geometric combination is based on the position of the third distance relative to the first and second distances.

21. The method of claim 20, wherein the geometric combination comprises interpolating the first and second complex envelopes.

22. The method of claim 21, including deriving the resistivity based on the magnitude of the geometric combination.

23. The method of claim 21, including deriving the resistivity based on the phase of the geometric combination.

24. A tool for measuring resistivity, comprising:

a first receiver pair mounted on said tool;

a first transmitter mounted on said tool that propagates a first signal to said first receiver pair over a first distance spanning the first receiver pair and the first transmitter, the first distance corresponding to a first depth of investigation;

a second transmitter mounted on said tool that propagates a second signal to said first receiver pair over a second distance spanning the first receiver pair and the second transmitter, the second distance corresponding to a second depth of investigation; and a measurement processor coupled to said first receiver pair, wherein said measurement processor combines outputs from the first receiver pair associated with the first and second signals to calculate a resistivity corresponding to a third depth of investigation, wherein the first, second, and third depths of investigation comprise different depths of investigation.

25. The resistivity tool of claim 24, wherein said measurement processor interpolates the first and second distances to determine the third depth of investigation.

26. The resistivity tool of claim 24, wherein said measurement processor calculates the resistivity based on the complex envelope of the first signal and the complex envelope of the second signal.

27. The resistivity tool of claim 26, wherein said measurement processor calculates the resistivity by combining an attenuation value associated with the first signal with an attenuation value associated with the second signal and selecting a resistivity value that corresponds to the combination.

28. The resistivity tool of claim 27 wherein the attenuation values associated with the first and second signals comprise attenuation values of signals received at said receiver pair.

29. The resistivity tool of claim 27, wherein the combination of attenuation values comprises linearly interpolating the attenuation values.

30. The resistivity tool of claim 27, wherein the combination of attenuation values comprises geometrically interpolating the attenuation values.

31. The resistivity tool of claim 26, wherein said measurement processor calculates the resistivity by combining a phase associated with the first signal with a phase associated with the second signal and selecting a resistivity value that corresponds to the combination.

32. The resistivity tool of claim 31 wherein the phases associated with the first and second signals comprise phases of signals received at said receiver pair.

33. The resistivity tool of claim 31, wherein the combination of phases comprises linearly interpolating the phases.

34. The resistivity tool of claim 33, wherein the combination of phases comprises geometrically interpolating the phases.

35. A compensated resistivity tool, comprising:

a first electromagnetic signal receiver;

a second electromagnetic signal receiver;

a first main transmitter located at a first distance above a center point between said first receiver and said second receiver, said first main transmitter capable of transmitting electromagnetic signals to said first and second receivers;

a first compensating transmitter located at the first distance below the center point, said first compensating transmitter capable of transmitting electromagnetic signals to said first and second receivers;

a second main transmitter located at a second distance above the center point, said second main transmitter capable of transmitting electromagnetic signals to said first and second receivers, wherein the second distance is smaller than the first distance;

a second compensating transmitter located at the second distance below the center point, said second compensating transmitter capable of transmitting electromagnetic signals to said first and second receivers; and a processor coupled to said first and second receivers, said processor determines a formation resistivity based on said electromagnetic signals and corresponding to a depth of investigation as a function of a third distance from the center point, wherein the third distance from the center point corresponds to a location at which said resistivity tool does not include a transmitter.

36. The resistivity tool of claim 35, wherein said processor combines electromagnetic signals received from said first and second main transmitters and said first and second compensating transmitter to determine the formation resistivity.

37. The resistivity tool of claim 36, wherein combining the electromagnetic signals comprises interpolation.

38. The resistivity tool of claim 37, wherein combining the electromagnetic signals comprises interpolating attenuation values to derive a composite attenuation value, and wherein the formation resistivity is determined as an attenuation resistivity associated with the composite attenuation value.

39. The resistivity tool of claim 38, wherein the interpolation comprises geometric interpolation.

40. The resistivity tool of claim 38, wherein the interpolation comprises linear interpolation.

41. The resistivity tool of claim 37, wherein combining the electromagnetic signals comprises interpolating phase values to derive a composite phase value, and wherein the formation resistivity is determined as a phase resistivity associated with the composite phase value.

42. The resistivity tool of claim 41, wherein the interpolation comprises geometric interpolation.

43. The resistivity tool of claim 42, wherein the interpolation comprises linear interpolation.

44. The resistivity tool of claim 36, wherein:

said processor combines electromagnetic signals received from said first main transmitter and said first compensating transmitter to form a first composite signal;

said processor combines electromagnetic signals received from said second main transmitter and said second compensating transmitter to form a second composite signal; and said processor interpolates the first and second composite signals to derive an apparent signal, and said processor determines the formation resistivity based on a property of the apparent signal.

45. The resistivity tool of claim 44, wherein said processor interpolates the magnitude of the first composite signal and the magnitude of the second signal to derive the apparent signal.

46. The resistivity tool of claim 45, wherein the property comprises the magnitude of the apparent signal.

47. The resistivity tool of claim 44, wherein said processor interpolates the phase of the first composite signal and the phase of the second signal to derive the apparent signal.

48. The resistivity tool of claim 47, wherein the property comprises the phase of the apparent signal.

* * * * *